(12) United States Patent
Bedetti

(10) Patent No.: US 7,966,745 B2
(45) Date of Patent: *Jun. 28, 2011

(54) FLUID BED GRANULATION PROCESS AND APPARATUS

(75) Inventor: Gianfranco Bedetti, Milan (IT)

(73) Assignee: Urea Casale S.A. (CH)

( * ) Notice: Subject to any disclaimer, the term of this patent is extended or adjusted under 35 U.S.C. 154(b) by 0 days.

This patent is subject to a terminal disclaimer.

(21) Appl. No.: 10/562,130

(22) PCT Filed: May 19, 2004

(86) PCT No.: PCT/EP2004/005376
§ 371 (c)(1),
(2), (4) Date: Dec. 23, 2005

(87) PCT Pub. No.: WO2005/002717
PCT Pub. Date: Jan. 13, 2005

(65) Prior Publication Data
US 2007/0000813 A1   Jan. 4, 2007

(30) Foreign Application Priority Data

Jun. 26, 2003  (EP) .................................... 03014631

(51) Int. Cl.
*F26B 11/02*   (2006.01)
(52) U.S. Cl. .................. 34/359; 34/381; 34/413; 34/80; 34/90; 34/105; 34/235; 423/342; 423/439; 427/213; 118/300; 435/41; 435/161; 241/39; 424/490
(58) Field of Classification Search ............... 34/359, 34/381, 413, 80, 90, 105, 235; 427/213; 118/300; 424/490; 241/39; 435/41, 161; 423/439, 342
See application file for complete search history.

(56) References Cited

U.S. PATENT DOCUMENTS

| | | | | | |
|---|---|---|---|---|---|
| 2,431,455 | A | * | 11/1947 | Blanding | 208/157 |
| 2,550,722 | A | * | 5/1951 | Rollman | 62/57 |
| 2,561,394 | A | * | 7/1951 | Marshall | 427/213 |
| 2,586,818 | A | * | 2/1952 | Harms | 209/474 |
| 2,629,938 | A | * | 2/1953 | Montgomery | 34/369 |
| 2,635,684 | A | * | 4/1953 | Mandeville | 159/48.1 |
| 2,648,609 | A | * | 8/1953 | Wurster | 427/213 |
| 2,701,758 | A | * | 2/1955 | Danulat et al. | 48/206 |
| 2,783,187 | A | * | 2/1957 | Odell | 208/163 |
| 2,813,352 | A | * | 11/1957 | Payne et al. | 34/370 |
| 3,002,805 | A | * | 10/1961 | Browning, Jr. et al. | 208/135 |
| 3,036,338 | A | | 5/1962 | Nack | |
| 3,087,253 | A | * | 4/1963 | Wulf | 34/360 |
| 3,206,865 | A | * | 9/1965 | Mcentee, Jr. | 34/363 |
| 3,287,408 | A | * | 11/1966 | Veltman | 34/395 |
| 3,295,221 | A | * | 1/1967 | Joy | 34/364 |
| 3,304,619 | A | * | 2/1967 | Futer | 34/370 |
| 3,313,035 | A | * | 4/1967 | Crawford et al. | 34/580 |
| 3,328,172 | A | * | 6/1967 | Smith, Jr. | 426/467 |

(Continued)

FOREIGN PATENT DOCUMENTS

DE         3935952 A1 * 3/1991

(Continued)

*Primary Examiner* — Stephen M. Gravini
(74) *Attorney, Agent, or Firm* — Akerman Senterfitt

(57) ABSTRACT

Fluid bed granulation process comprising the step of cooling the granules in a cooling fluid bed (F2). At least part of the fluidizing air coming out from said cooling fluid bed (F2) is fed into the granulation fluid bed (F1).

12 Claims, 2 Drawing Sheets

U.S. PATENT DOCUMENTS

| | | | | |
|---|---|---|---|---|
| 3,345,180 A * | 10/1967 | Smith, Jr. | | 426/314 |
| 3,372,734 A * | 3/1968 | Grubb et al. | | 165/104.18 |
| 3,395,634 A * | 8/1968 | Smith, Jr. | | 99/483 |
| 3,398,458 A * | 8/1968 | Berquin et al. | | 34/499 |
| 3,412,473 A * | 11/1968 | Muhlrad | | 34/363 |
| 3,466,021 A * | 9/1969 | Van Weert et al. | | 432/4 |
| 3,494,046 A * | 2/1970 | Harkreader | | 34/370 |
| 3,615,253 A * | 10/1971 | Warzel | | 422/131 |
| 3,681,851 A * | 8/1972 | Fleming | | 34/291 |
| 3,723,395 A * | 3/1973 | Warzell | | 526/65 |
| 3,755,913 A * | 9/1973 | Koller et al. | | 34/368 |
| 3,817,696 A * | 6/1974 | Hereth | | 432/15 |
| 3,818,846 A * | 6/1974 | Reese | | 110/187 |
| 4,021,193 A * | 5/1977 | Waters | | 432/58 |
| 4,067,118 A * | 1/1978 | Morin | | 34/359 |
| 4,157,245 A * | 6/1979 | Mitchell et al. | | 48/197 R |
| 4,215,151 A * | 7/1980 | Rios et al. | | 426/467 |
| 4,219,589 A * | 8/1980 | Niks et al. | | 427/213 |
| 4,226,830 A * | 10/1980 | Davis | | 422/143 |
| 4,254,557 A * | 3/1981 | Mayer et al. | | 34/249 |
| 4,254,558 A * | 3/1981 | Mayer | | 34/249 |
| 4,254,616 A * | 3/1981 | Siminski et al. | | 60/39.12 |
| 4,255,166 A * | 3/1981 | Gernand et al. | | 95/27 |
| 4,255,403 A * | 3/1981 | Mayer et al. | | 423/244.06 |
| 4,280,415 A * | 7/1981 | Wirguin et al. | | 110/224 |
| 4,320,795 A * | 3/1982 | Gwyn et al. | | 165/104.16 |
| 4,353,730 A * | 10/1982 | Kinno et al. | | 71/29 |
| 4,356,162 A * | 10/1982 | Lumbeck et al. | | 423/600 |
| 4,395,830 A * | 8/1983 | Lockwood | | 34/365 |
| 4,422,960 A * | 12/1983 | Shiroto et al. | | 502/206 |
| 4,424,176 A * | 1/1984 | Shirley et al. | | 264/7 |
| 4,444,655 A * | 4/1984 | Shiroto et al. | | 208/210 |
| 4,479,308 A * | 10/1984 | Bertelsen | | 34/360 |
| 4,501,773 A * | 2/1985 | Nioh et al. | | 427/213 |
| 4,506,453 A * | 3/1985 | Shirley et al. | | 34/393 |
| 4,532,155 A * | 7/1985 | Golant et al. | | 427/213 |
| 4,533,572 A * | 8/1985 | Neelameggham et al. | | 427/216 |
| 4,535,065 A * | 8/1985 | Klein et al. | | 502/21 |
| 4,535,550 A * | 8/1985 | Walter | | 34/499 |
| 4,561,192 A * | 12/1985 | Meade | | 34/359 |
| 4,563,315 A * | 1/1986 | Walter et al. | | 264/8 |
| 4,601,113 A * | 7/1986 | Draper et al. | | 34/359 |
| 4,602,438 A * | 7/1986 | Draper et al. | | 34/363 |
| 4,621,437 A * | 11/1986 | Grande et al. | | 34/361 |
| 4,627,173 A * | 12/1986 | O'Hagan et al. | | 34/369 |
| 4,628,833 A * | 12/1986 | O'Hagan et al. | | 110/263 |
| 4,644,664 A * | 2/1987 | Bradshaw | | 34/361 |
| 4,657,767 A * | 4/1987 | Meade | | 426/471 |
| 4,670,993 A * | 6/1987 | Dunaway et al. | | 34/371 |
| 4,704,378 A * | 11/1987 | Fleming et al. | | 502/355 |
| 4,797,271 A * | 1/1989 | Fleming et al. | | 423/625 |
| 4,839,969 A * | 6/1989 | Hahn | | 34/169 |
| 4,861,562 A * | 8/1989 | Rowe | | 422/143 |
| 4,946,653 A | 8/1990 | Stopp et al. | | |
| 4,974,336 A * | 12/1990 | Hahn | | 34/443 |
| 5,012,033 A * | 4/1991 | Child et al. | | 585/722 |
| 5,019,302 A * | 5/1991 | Sparks et al. | | 264/8 |
| 5,070,049 A * | 12/1991 | Amino et al. | | 501/88 |
| 5,100,592 A * | 3/1992 | Sparks et al. | | 264/7 |
| 5,119,570 A * | 6/1992 | Russemeyer et al. | | 34/363 |
| 5,136,791 A * | 8/1992 | Fraile et al. | | 34/586 |
| 5,213,820 A | 5/1993 | Uhlemann et al. | | |
| 5,355,590 A * | 10/1994 | Slangen et al. | | 34/385 |
| 5,368,824 A * | 11/1994 | Nell et al. | | 422/143 |
| 5,476,639 A * | 12/1995 | Hyppanen | | 422/147 |
| 5,505,885 A * | 4/1996 | Bacardi et al. | | 264/7 |
| 5,595,001 A * | 1/1997 | Schutte et al. | | 34/579 |
| 5,632,102 A * | 5/1997 | Luy et al. | | 34/582 |
| 5,689,024 A * | 11/1997 | Schmitt | | 585/467 |
| 5,849,862 A * | 12/1998 | Davies et al. | | 528/502 E |
| 5,946,818 A * | 9/1999 | Baxter et al. | | 34/379 |
| 6,042,369 A * | 3/2000 | Bergman et al. | | 432/15 |
| 6,058,623 A * | 5/2000 | Brooks et al. | | 34/362 |
| 6,063,751 A * | 5/2000 | France et al. | | 510/444 |
| 6,088,934 A * | 7/2000 | Newton | | 34/360 |
| 6,101,739 A * | 8/2000 | Rutz et al. | | 34/373 |
| 6,103,215 A * | 8/2000 | Zones et al. | | 423/702 |
| 6,114,475 A * | 9/2000 | Goode et al. | | 526/62 |
| 6,168,709 B1 * | 1/2001 | Etter | | 208/131 |
| 6,270,708 B1 * | 8/2001 | Gurol | | 264/117 |
| 6,270,937 B2 * | 8/2001 | Yuasa et al. | | 430/108.7 |
| 6,287,622 B1 * | 9/2001 | Martinez-Serna Villagran et al. | | 426/549 |
| 6,326,116 B2 * | 12/2001 | Yuasa et al. | | 430/110.1 |
| 6,417,133 B1 * | 7/2002 | Ebner et al. | | 502/185 |
| 6,432,599 B1 * | 8/2002 | Yuasa et al. | | 430/108.4 |
| 6,586,621 B2 * | 7/2003 | Leiber et al. | | 562/17 |
| 6,603,039 B1 * | 8/2003 | Ebner et al. | | 562/17 |
| 6,645,905 B2 * | 11/2003 | Gaffney et al. | | 502/311 |
| 6,682,578 B2 * | 1/2004 | Sower | | 71/11 |
| 6,746,496 B1 * | 6/2004 | Kravitz et al. | | 48/118.5 |
| 6,754,979 B2 * | 6/2004 | Ludwig et al. | | 34/372 |
| 6,827,786 B2 * | 12/2004 | Lord | | 118/716 |
| 6,841,699 B2 * | 1/2005 | Bogan et al. | | 562/547 |
| 6,846,343 B2 * | 1/2005 | Sower | | 71/15 |
| 6,927,304 B2 * | 8/2005 | Leiber | | 562/17 |
| 6,956,005 B2 * | 10/2005 | Leiber | | 502/185 |
| 6,963,009 B2 * | 11/2005 | Leiber et al. | | 562/17 |
| 7,018,951 B2 * | 3/2006 | Gaffney et al. | | 502/311 |
| 7,024,796 B2 * | 4/2006 | Carin et al. | | 34/363 |
| 7,024,800 B2 * | 4/2006 | Carin et al. | | 34/576 |
| 7,026,266 B2 * | 4/2006 | Chaudhari et al. | | 502/155 |
| 7,045,160 B1 * | 5/2006 | de Haan et al. | | 426/61 |
| 7,067,693 B1 * | 6/2006 | Ebner et al. | | 562/17 |
| 7,129,373 B2 * | 10/2006 | Coleman et al. | | 562/17 |
| 7,193,107 B2 * | 3/2007 | Leiber | | 562/17 |
| 7,232,581 B2 * | 6/2007 | Mikkelsen et al. | | 426/2 |
| 7,232,635 B2 * | 6/2007 | Kobayashi et al. | | 430/122.1 |
| 7,291,751 B2 * | 11/2007 | Leiber et al. | | 562/17 |
| 7,306,780 B1 * | 12/2007 | Kravitz et al. | | 423/648.1 |
| 7,348,292 B2 * | 3/2008 | Gaffney et al. | | 502/311 |
| 7,390,920 B2 * | 6/2008 | Coleman et al. | | 562/17 |
| 7,396,955 B2 * | 7/2008 | Gaffney et al. | | 562/400 |
| 7,404,262 B2 * | 7/2008 | Jurkovich et al. | | 34/381 |
| 7,427,302 B1 * | 9/2008 | Kravitz et al. | | 23/300 |
| 7,487,601 B2 * | 2/2009 | Carin et al. | | 34/381 |
| 7,488,464 B2 * | 2/2009 | Hammel et al. | | 423/592.1 |
| 7,574,816 B2 * | 8/2009 | Shivvers | | 34/333 |
| 7,610,692 B2 * | 11/2009 | Carin et al. | | 34/388 |
| 7,617,617 B2 * | 11/2009 | Gorbell et al. | | 34/60 |
| 7,622,033 B1 * | 11/2009 | McGehee | | 208/50 |
| 7,632,434 B2 * | 12/2009 | Duescher | | 264/12 |
| 7,685,737 B2 * | 3/2010 | Gorbell et al. | | 34/86 |
| 7,820,126 B2 * | 10/2010 | Fallavollita | | 423/349 |
| 7,820,418 B2 * | 10/2010 | Karl et al. | | 435/161 |
| 7,842,484 B2 * | 11/2010 | Lewis | | 435/161 |
| 7,866,060 B2 * | 1/2011 | Carin et al. | | 34/487 |
| 7,882,646 B2 * | 2/2011 | Gorbell et al. | | 34/514 |
| 2001/0000743 A1 * | 5/2001 | Yuasa et al. | | 430/110 |
| 2001/0002305 A1 * | 5/2001 | Yuasa et al. | | 430/110 |
| 2002/0016503 A1 * | 2/2002 | Leiber et al. | | 562/531 |
| 2002/0086229 A1 * | 7/2002 | Yuasa et al. | | 430/108.4 |
| 2002/0179493 A1 * | 12/2002 | Etter | | 208/131 |
| 2002/0183198 A1 * | 12/2002 | Gaffney et al. | | 502/215 |
| 2002/0188149 A1 * | 12/2002 | Bogan et al. | | 558/321 |
| 2003/0084693 A1 * | 5/2003 | Sower | | 71/11 |
| 2003/0092565 A1 * | 5/2003 | Chaudhari et al. | | 502/150 |
| 2003/0157247 A1 * | 8/2003 | Chikami et al. | | 427/212 |
| 2003/0171611 A1 * | 9/2003 | Leiber | | 562/17 |
| 2003/0172697 A1 * | 9/2003 | Sower | | 71/11 |
| 2003/0190547 A1 * | 10/2003 | Kobayashi et al. | | 430/125 |
| 2003/0229246 A1 * | 12/2003 | Leiber et al. | | 562/17 |
| 2004/0010160 A1 * | 1/2004 | Coleman et al. | | 562/17 |
| 2004/0029725 A1 * | 2/2004 | Gaffney et al. | | 502/208 |
| 2004/0068138 A1 * | 4/2004 | Leiber | | 562/17 |
| 2004/0181085 A1 * | 9/2004 | Bogan et al. | | 558/323 |
| 2004/0235406 A1 * | 11/2004 | Duescher | | 451/527 |
| 2005/0074380 A1 * | 4/2005 | Boren et al. | | 423/1 |
| 2005/0176989 A1 * | 8/2005 | Coleman et al. | | 562/11 |
| 2005/0176990 A1 * | 8/2005 | Coleman et al. | | 562/11 |
| 2006/0010712 A1 * | 1/2006 | Carin et al. | | 34/443 |
| 2006/0010714 A1 * | 1/2006 | Carin et al. | | 34/514 |
| 2006/0020143 A1 * | 1/2006 | Leiber | | 562/17 |
| 2006/0032788 A1 * | 2/2006 | Etter | | 208/131 |
| 2006/0068988 A1 * | 3/2006 | Coleman et al. | | 502/182 |
| 2006/0069280 A1 * | 3/2006 | Gaffney et al. | | 558/325 |
| 2006/0101665 A1 * | 5/2006 | Carin et al. | | 34/513 |

| | | | | |
|---|---|---|---|---|
| 2006/0101881 A1* | 5/2006 | Carin et al. ............ 71/21 |
| 2006/0201024 A1* | 9/2006 | Carin et al. ............ 34/576 |
| 2006/0229466 A1 | 10/2006 | Arhancet et al. ............ 562/531 |
| 2006/0254079 A1* | 11/2006 | Gorbell et al. ............ 34/363 |
| 2006/0254080 A1* | 11/2006 | Carin et al. ............ 34/363 |
| 2006/0254081 A1* | 11/2006 | Carin et al. ............ 34/576 |
| 2007/0100161 A1* | 5/2007 | Ebner et al. ............ 562/17 |
| 2007/0129567 A1* | 6/2007 | Leiber et al. ............ 562/17 |
| 2007/0137062 A1* | 6/2007 | Eck ............ 34/360 |
| 2007/0163142 A1* | 7/2007 | Carin et al. ............ 34/282 |
| 2007/0243591 A1* | 10/2007 | Peeters et al. ............ 435/134 |
| 2008/0022547 A1* | 1/2008 | Shivvers ............ 34/333 |
| 2008/0044337 A1* | 2/2008 | Fallavollita ............ 423/349 |
| 2008/0103331 A1* | 5/2008 | Gaffney et al. ............ 562/400 |
| 2008/0104858 A1* | 5/2008 | Carin et al. ............ 34/282 |
| 2008/0105019 A1* | 5/2008 | Carin et al. ............ 71/15 |
| 2008/0189976 A1* | 8/2008 | Krell et al. ............ 34/359 |
| 2008/0189980 A1* | 8/2008 | Krell et al. ............ 34/586 |
| 2008/0201980 A1* | 8/2008 | Bullinger et al. ............ 34/493 |
| 2008/0209755 A1* | 9/2008 | Shivvers ............ 34/363 |
| 2008/0318768 A1* | 12/2008 | Coleman et al. ............ 502/177 |
| 2009/0117635 A1* | 5/2009 | Bradley et al. ............ 435/165 |
| 2009/0196848 A1* | 8/2009 | Davis ............ 424/78.31 |
| 2010/0032630 A1* | 2/2010 | Hariharan et al. ............ 252/516 |
| 2010/0041546 A1* | 2/2010 | Coleman et al. ............ 502/177 |
| 2010/0059428 A1* | 3/2010 | Boren et al. ............ 210/137 |
| 2010/0061911 A1* | 3/2010 | Hariharan et al. ............ 423/341 |
| 2010/0061913 A1* | 3/2010 | Hariharan et al. ............ 423/342 |
| 2010/0068116 A1* | 3/2010 | Kim et al. ............ 423/349 |
| 2010/0130774 A1* | 5/2010 | Wan et al. ............ 562/17 |
| 2010/0136336 A1* | 6/2010 | Borgese et al. ............ 428/402 |
| 2010/0162946 A1* | 7/2010 | Bender ............ 117/202 |
| 2011/0023778 A1* | 2/2011 | Fallavollita ............ 118/666 |
| 2011/0027828 A1* | 2/2011 | Peeters et al. ............ 435/41 |
| 2011/0059002 A1* | 3/2011 | Fallavollita ............ 423/345 |

FOREIGN PATENT DOCUMENTS

| | | |
|---|---|---|
| DE | 3935953 A1 * | 3/1991 |
| EP | 1043051 A2 * | 10/2000 |
| EP | 1 312 410 A1 | 5/2003 |
| EP | 1 707 258 * | 10/2006 |
| FR | 2942803 A1 * | 9/2010 |
| GB | 2183670 A * | 6/1987 |
| JP | 57032726 A * | 2/1982 |
| JP | 2001187753 A * | 7/2001 |
| JP | 2008193971 A * | 8/2008 |
| WO | 02/074427 A2 | 9/2002 |

* cited by examiner

FLUID BED GRANULATION PROCESS AND APPARATUS

FIELD OF APPLICATION

In its most general aspect, the present invention refers to a fluid bed granulation process of an appropriate substance like, for example, urea, ammonium nitrate, ammonium chloride and similar substances susceptible to being granulated.

In particular, this invention concerns a fluid bed granulation process comprising control of the temperature of said bed through injection therein of a flow of hot air.

The invention also refers to a granulation apparatus, used to carry out the aforementioned process.

PRIOR ART

It is known that in a fluid bed granulation process, the obtainment of a predetermined substance takes place through continuous growth (in volume and in mass), of granule seeds of such a substance, continuously fed into said fluid bed, at the same time with a flow of an appropriate growth substance in liquid state.

Generally, the growth substance is of the same nature as the substance to be granulated and is in liquid form, suitable for wetting, adhering and solidifying on the seeds and on the growing granules which, together, constitute said fluid bed.

Said growth substance is fed to the fluid bed at a high temperature so that the growth substance itself, once solidified on the seeds, can keep adherence characteristics such as to allow adhesion to the granule of further growth substance while it is inside the fluid bed.

Moreover, inside the fluid bed it is necessary to maintain the temperature within predetermined and, generally, relatively high values in order to allow the evaporation of the solvent present in the growth substance which is generally fed in solution, for example aqueous in the case of urea, into said fluid bed.

The temperature of the fluid bed must be chosen also taking into account the fact that a possible cooling of the growth substance, before its contact with the seeds and with the growing granules, could determine a premature solidification thereof, with consequent difficulties, if not actually impossibility, in adhesion to the granules and with formation of powders which require subsequent recovering.

To satisfy the aforementioned requirement, in other words to control and adjust the temperature of the fluid bed within predetermined values, it has been proposed to feed, into the granulation fluid bed itself, an additional flow of appropriately hot air, which is preferably injected at the same level as the flow of growth substance.

Moreover, during the start-up step, or in operation with low loads, or else when the fluidification air, which is used with the very high flow rates required for the formation and maintenance of the fluid bed, is at a particularly cold room temperature, it becomes necessary to carry out a suitable preheating of such fluidification air through suitable heat exchangers outside the fluid bed.

Although advantageous from some points of view, such a suggestion suffers from a serious recognized drawback.

Indeed, due to the very high air flow rates circulating in the fluid bed, a control of the temperature according to the aforementioned suggestion necessarily involves very high energy consumption for the preheating of the fluidification air (when required) and of the additional flow of air. This energy consumption has a negative impact upon the operating costs of the process.

The presence of such apparatuses for preheating the air also have a negative impact upon the embodying costs and the structural complexity of the corresponding granulation plant.

SUMMARY OF THE INVENTION

The technical problem underlying the present invention is to devise and to make available a fluid bed granulation process of the type considered above, having functional characteristics so as to overcome all the cited drawbacks linked to the prior art and, in particular, such that the total energy consumption necessary to keep the fluid bed at a predetermined temperature which ensures the optimal completion of the process is substantially reduced.

The problem is solved according to the invention by a fluid bed granulation process of an appropriate substance, with control of the temperature of said bed, comprising a cooling step of the finished hot granules thus obtained, in a respective cooling fluid bed, characterized in that at least a part of the fluidification air coming out from said cooling fluid bed of the finished granules is fed into the granulation fluid bed.

Preferably, all of the fluidification air fed into the granulation bed comes from the cooling bed.

Advantageously, substantially all of the fluidification air coming out from the cooling bed is used as fluidification air of said granulation bed.

Even more advantageously, the fluid bed granulation process of the present invention is characterized in that it uses one single flow of fluidification air to continuously form and support, in order, said cooling and granulation fluid beds, substantially arranged in series with respect to said single flow and in fluid communication with each other.

Further characteristics and advantages of the invention will become clearer from the detailed description of an embodiment of a fluid bed granulation process according to the invention, given hereafter with reference to the attached drawings, for indicative and non-limiting purposes.

DETAILED DESCRIPTION OF A PREFERRED EMBODIMENT

Figure 1:
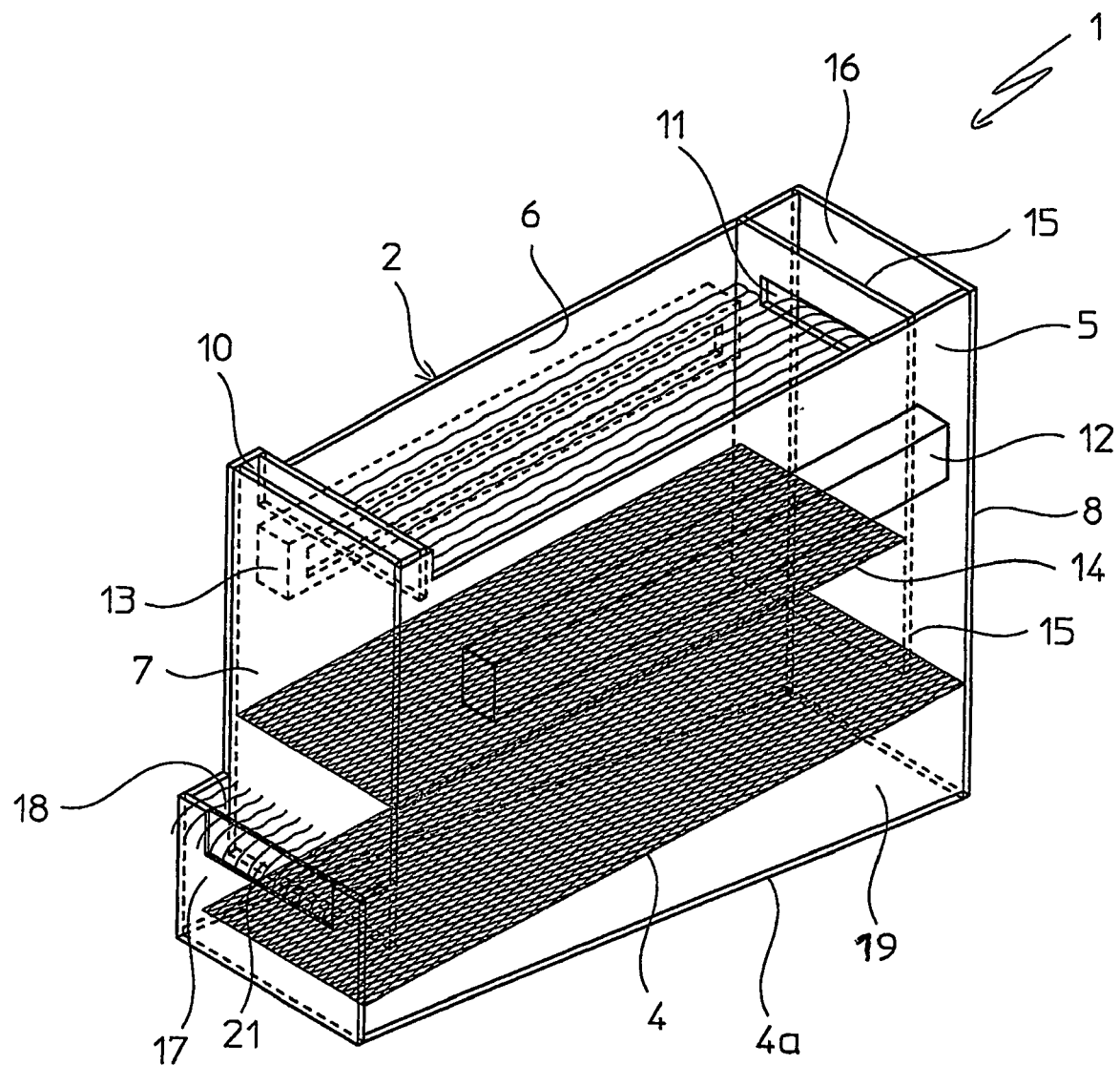
FIG. 1 schematically shows an axonometric view of an apparatus for carrying out the fluid bed granulation method of the present invention.

With reference to the figures, an apparatus for carrying out a fluid bed granulation process according to the present invention is globally indicated with 1.

Such an apparatus comprises a self-supporting structure 2, substantially in the shape of a parallelepiped container, which defines a space A inside it, in which two fluid beds F1 and F2 are intended to be realized, as can be seen more clearly in the rest of the description.

Said container structure 2 (which hereafter shall simply be called: container 2), has long side walls 5, 6, short front 7 (or top) and rear 8 walls; it is closed at the top by a conventional and therefore unrepresented cover, and it is equipped at the bottom with a double base plate, 4, 4a, upper and lower respectively.

In accordance with a characteristic of the present invention, the top wall 7, of said container 2, has the bottom side 7a, spaced from the base plate 4, of said double base plate, with which it thus defines a passage (or port) 20, which places the space A in communication with the outside of said container 2. Moreover, in accordance with another characteristic of the present invention, the aforementioned base plates 4, 4a, extend from the rear wall 8, of the container 2, up to past said top wall 7, for a predetermined length portion. At their free front ends, to a front panel 17 is fixed to the base plates 4, 4a, preferably substantially parallel to the top wall 7, with which it constitutes a sort of pocket 18, in the example of the figures extending for the whole width of said wall 7 and in communication with the space A, through the aforementioned passage 20.

The base plates 4, 4a of said double base plate, the rear wall 8 of the container 2 and the front panel 17 define a chamber 19 that is in fluid communication with the space A right through said base plate 4, provided perforated, grated or in any case permeable to gas flows. Said chamber 19, extending below the space A, is of limited height and is intended to constitute a chamber for uniform distribution of a flow of fluidification air coming into said space A, as will better turn out from the following of the description.

Advantageously and in accordance with a further characteristic of the present invention, said distribution chamber 19 has a tapered profile starting from the rear wall 8 of the container 2, towards the front panel 17. For such a purpose, the base plate 4a is provided tilted on the opposite base plate 4, and converging on it towards the aforementioned front panel 17.

Inside said container 2 a rectangular vertical panel 15 is supported, parallel and in a predetermined spaced relationship from the rear wall 8 of said container 2, with which it defines an interspace 16.

Said panel 15 is fixed to the opposite long walls 5 and 6 and to the top wall 3 of said container 2, whereas it has the horizontal bottom side 15a spaced from the base plate 4, so as to define with it a passage (or port) 15a, suitable for placing said interspace 16 in communication with the space A inside the container itself. The interspace 16 is in communication with the space A, also close to the upper wall of said container 2, through an opening 11.

Inside the container 2 and at a predetermined distance from its base plate 4, a rectangular shelf 14 is positioned, perimetrically fixed to the long sides 5, 6, to the front wall 7, of said container 2 and to the aforementioned panel 15. Said shelf 14, defines in said space A, a granulation zone B inside the space A and is intended to support the granulation bed F1 of a predetermined substance; for such a purpose the shelf 14 is perforated, grated or in any case made permeable to a flow of fluidification air, necessary for the formation and maintenance of said bed F1.

In FIG. 1, a distributor device (per se known) of seeds of granules of the substance to be granulated, positioned in the container 2, at its top, is schematized with 10, whereas distributor-supplier devices of granule growth liquid substance (also known and therefore not represented in detail) are schematized with 12 and 13.

Figure 2:
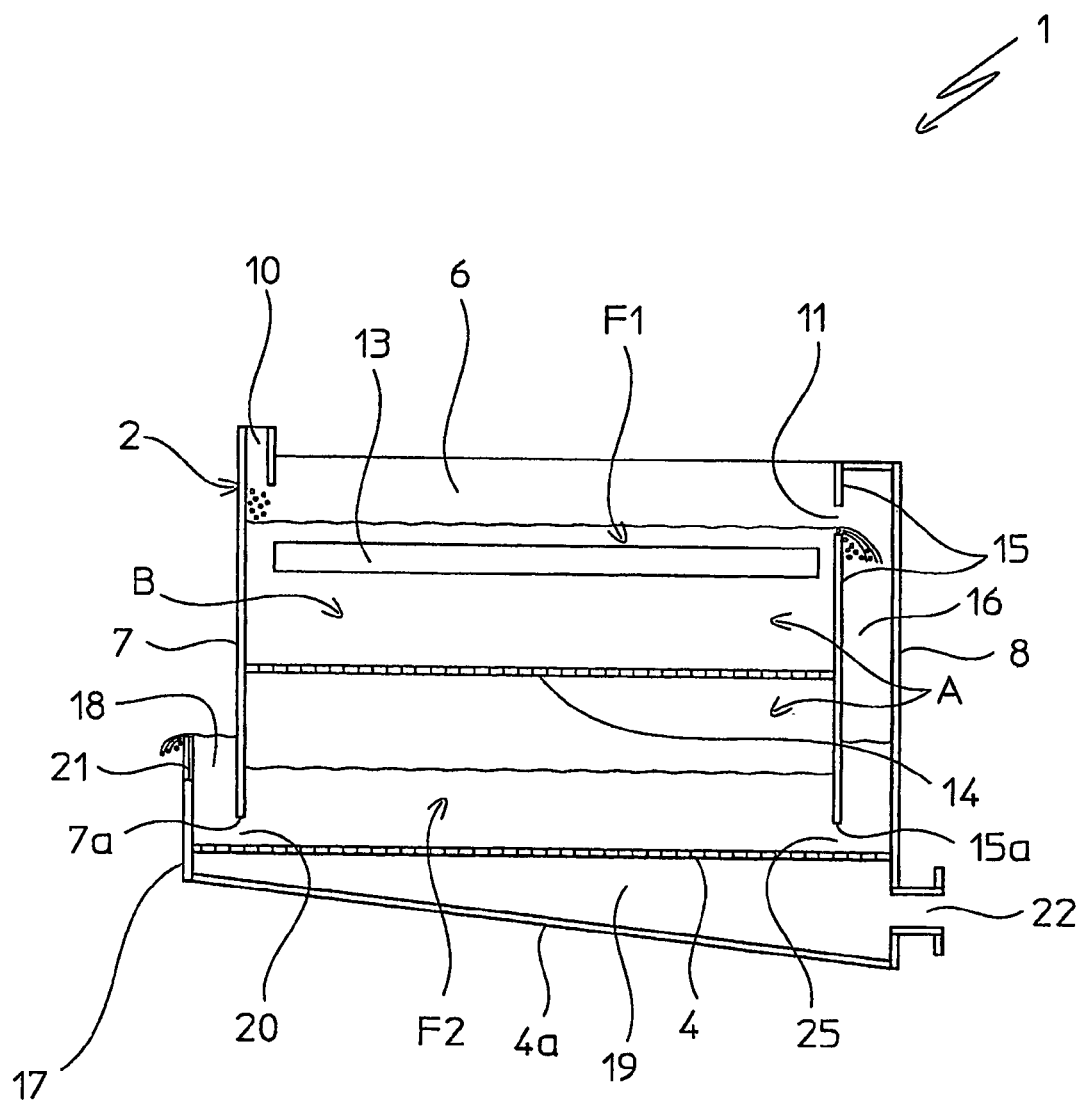
FIG. 2 schematically shows a cross section of the same apparatus of FIG. 1.

In FIG. 2, an opening is schematized with 22, associated with the rear wall 8, for the entry of air inside the chamber 19. Such an opening 22 is in fluid communication with per se known, and therefore not represented, means to blow the air into said chamber 19.

With reference to the apparatus of FIGS. 1 and 2, an embodiment of the granulation process of the present invention shall now be described.

By feeding a continuous flow of seeds of granules of a predetermined substance and at the same time a continuous flow of growth substance into the granulation zone B, a granulation fluid bed F1 is formed on the shelf 14. This granulation bed is obtained, supported and maintained through a continuous flow of fluidification air, fed into the chamber 19 and from here, through the base plate 4, into the space A, below said shelf 14. Corresponding to the proceeding of the granulation (growth of granules) there is an increase in the height of the fluid bed F1, until its free surface reaches the (precalculated) level of the opening 11. At this point, through said opening 11, which substantially acts as a weir, begins a continuous pouring (or "discharge") from the bed F1 to the interspace 16, of granules of substance which are very hot (their temperature depends upon the temperature of the growth substance) and above all which are finished, in other words of predetermined grain size.

From the start of such pouring onwards the height of the granulation bed F1 remains substantially constant.

The finished granules, continuously passed in the interspace 16, "fall" in a substantially guided manner, or in a cascade, on a fluid bed F2 comprising finished granules 15 arranged for the starting step adjacent to the perforated base plate 4, where they are subjected to the aforementioned flow of fluidification air used for the bed F1. On such a base plate 4 a second fluid bed F2 is thus defined, consisting exclusively of finished granules, which extends in said space A, on said base plate 4, in the interspace 16 and in the pocket 18, which communicate with said space.

On the free surface of the fluid bed F2 at the interspace 16 and the pocket 18 there is a lower pressure with respect to what can be measured on the free surface of the fluid bed F2 at the chamber A, between the walls 7 and 15; for this reason, and since the three quoted zones are functionally comparable to communicating vessels, the height of the fluid bed F2 in the interspace 16 and in the pocket 18 is greater with respect to that between the walls 7 and 15, on said base plate 4.

It should be noted that the cooling fluid bed F2 is in fluid communication with the overlying granulation bed F1 exclusively through the shelf 14, for supporting said bed.

It should also be noted that the aforementioned interspace 16 carries out a duct function, so-called downcomer, for the transfer of the granules from bed F1 to bed F2.

In the fluid bed F2, the hot finished granules exchange heat with the flow of fluidification air, fed at room temperature. While the finished granules cool down, this air is heated by them. And this same heated air, coming out from the fluid bed F2, is used as fluidification air of the granulation bed F1, to which it is fed.

For such a reason, the zone of space A between said base plate 4 and the overlying shelf 14, is known as the granule cooling zone and, at the same time, it can be considered the preheating zone of the fluidification air of the granulation bed F1.

Feeding preheated fluidification air to the granulation bed means, on the one hand, providing the amount of air necessary for the formation and maintenance of said fluid bed and, on the other hand, giving to this same bed the amount of heat necessary to decrease or even prevent premature solidification of the growth substance and, at the same time, to allow the evaporation of the solvent possibly present in the growth substance fed, in solution, into the growth fluid bed.

Using the air coming out from the granule-cooling fluid bed as preheated fluidification air for the granulation bed also means reducing the total air consumption to complete the granulation process.

The height of the fluid bed F2 (granule cooling bed and fluidification air preheating bed) is such that its free surface in the pocket 18 reaches the upper edge of the front panel 17, ensuring the discharge, to the outside of the container 2, of finished and cooled granules.

Since the fluid bed, as is well known, has behavior totally comparable to that of a liquid, the levels of the granules in the pocket 18, in the interspace 16 and in the space A are stabilized at the respective piezometric heights.

It should therefore be noted that the height of said front panel 17, by determining the height of the fluid bed F2, also determines the average permanency time of the finished and hot granules in the cooling zone and, consequently, determines both the temperature of the finished granules discharged from the container 2 and, above all, the preheating temperature of the fluidification air.

From the start of the aforementioned "discharge" of finished granules, the process of the present invention and the relative apparatus are in operation.

At this point a basic characteristic of the process of the present invention should be noted: the beds F1 and F2, respectively for granulation and cooling of the finished granules/ preheating of fluidification air, are formed and supported by a same flow of fluidification air, with respect to which said beds F1 and F2 are arranged substantially in series.

A second characteristic of the aforementioned process is that the finished and hot granules are poured substantially in cascade from said granulation bed to the cooling bed.

The main advantage achieved by the present invention consists, as stated, of the large saving in energy consumption with respect to what has been required up to now to carry out fluid bed granulation processes of the prior art, wherein a temperature control is provided through introduction of an additional hot air flow or by pre-heating, by means of heat exchangers, of the fluidification air itself during predetermined situations of the operating cycle of the granulation process. Taking into account the considerable amounts of fluidification air and additional hot air involved in the aforementioned processes, the aforementioned energy saving translates into an equally substantial reduction in the operating costs of the process.

This advantage is made possible thanks to the use of a single flow of air for the fluidification of the cooling bed of the finished granules and, in the order, of the granulation bed, which involves an effective preheating of the air subsequently fed to the latter operation.

According to a preferred embodiment, the front panel 17 comprises a mobile bulkhead 21, adjustable in height (able to slide vertically).

By varying the height of such a front panel 17, the height of the second fluid bed F2 is consequently varied. This means that, if for example the height of such a front panel 17 is increased, the height of the second fluid bed F2 increases and, consequently, the average permanency time of the granules inside such a bed also increases.

This entails an improved heat exchange between the aforementioned granules and the fluidification air, which can increase its entry temperature into the granulation bed F1.

The invention thus, conceived is susceptible to further variants and modifications all of which fall within the inventive concept and, as such, fall within the scope of protection of the invention itself, as defined by the following claims.

For example, the pocket 18 and the interspace 16 can be realized with a width lower than the width of the corresponding short front wall 7, of the panel 15 respectively.

The invention claimed is:

1. A fluid bed granulation process comprising the steps of:
   feeding granule seeds of a predetermined substance at a controlled temperature into a granulation fluid bed, at the same time as a flow of an appropriate growth substance in liquid state;
   removing the finished hot granules from said granulation fluid bed;
   cooling down said granules in a cooling fluid bed, wherein the cooling fluid bed is continuously formed and supported by a respective flow of fluidification air; and
   reusing at least part of the fluidification air coming out from said cooling fluid bed of the finished granules by feeding it into the granulation fluid bed;
   wherein said at least part of the fluidification air coming out from said cooling fluid bed of the finished granules that is reused and fed into the granulation fluid bed is used as fluidification air of said granulation fluid bed.

2. The fluid bed granulation process according to claim 1, wherein all of the fluidification air fed into the granulation bed comes from the cooling bed as pre-heated fluidification air to reduce both the total air consumption and total energy consumption required to complete the fluid bed granulation process.

3. The fluid bed granulation process according to claim 1, wherein substantially all of the fluidification air coming out from the cooling bed is used as fluidification air for said granulation bed.

4. The fluid bed granulation process according to claim 1, wherein all the fluidification air coming out from said cooling fluid bed is fed into the granulation fluid bed so that a single flow of fluidification air is used to continuously form and support, in order, said cooling and granulation fluid beds substantially arranged in series with respect to said-flow of fluidification air.

5. The fluid bed granulation process according to claim 4, wherein the finished granules of said substance are transferred substantially in a cascade to said cooling fluid bed.

6. An apparatus for carrying out the fluid bed granulation process at controlled temperature of claim 4, comprising:
   a self-supporting structure substantially shaped like a container, defining a granulation space inside of it, in which a shelf is positioned, intended to support a granulation fluid bed;
   a further base plate in said space, positioned below and in a predetermined distanced relationship from said shelf, said base plate being intended to support a respective cooling fluid bed of hot finished granules coming from said granulation bed, said cooling bed being positioned below said granulation bed and in fluid communication with said granulation bed through said shelf, provided perforated, grated or in any case permeable to gas flows;
   a downcomer, extending vertically in said space, suitable for the transfer of finished granules from said granulation fluid bed to said cooling fluid bed at said further base plate; and
   a feeding opening and a distribution chamber feeding and distributing fluidification air in said space below said further base plate, to form and maintain said cooling bed and said granulation bed, which are arranged in series with respect to said flow.

7. The apparatus according to claim 6, wherein said downcomer comprises a vertical panel, supported in said space in a predetermined spaced relationship from a wall of said container structure, defining with it an interspace, said panel having a horizontal bottom side spaced from said further base plate, so as to define with it a passage, suitable for putting said interspace in communication with the space above the aforementioned base plate.

8. The apparatus according to claim 7, wherein said interspace is in communication at the top with said space, through an opening provided in it.

9. The apparatus according to claim 6, wherein said cooling fluid bed is in communication with the outside through a pocket comprised between a wall of said container structure and a front panel fixed to the base plate supporting the cooling bed.

10. The apparatus according to claim 9, wherein said front panel comprises a mobile bulkhead, adjustable in height.

11. The apparatus according to claim 9, wherein said front panel is parallel to said top wall.

12. The apparatus according to claim 10, wherein a height of said front panel determines an average permanency time of the hot finished granules in a cooling zone and, consequently, determines both a temperature of finished granules discharged from the apparatus and a preheating temperature of the fluidification air.

\* \* \* \* \*